United States Patent
Jenne et al.

(10) Patent No.: US 9,811,471 B2
(45) Date of Patent: Nov. 7, 2017

(54) PROGRAMMABLE CACHE SIZE VIA CLASS OF SERVICE CACHE ALLOCATION

(71) Applicant: Dell Products, L.P., Round Rock, TX (US)

(72) Inventors: John Erven Jenne, Austin, TX (US); Stuart A. Berke, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 56 days.

(21) Appl. No.: 15/063,903

(22) Filed: Mar. 8, 2016

(65) Prior Publication Data

US 2017/0262375 A1    Sep. 14, 2017

(51) Int. Cl.
*G06F 12/00* (2006.01)
*G06F 12/0895* (2016.01)
*G06F 12/0891* (2016.01)
*G06F 12/0804* (2016.01)

(52) U.S. Cl.
CPC ...... *G06F 12/0895* (2013.01); *G06F 12/0891* (2013.01); *G06F 12/0804* (2013.01); *G06F 2212/6042* (2013.01)

(58) Field of Classification Search
None
See application file for complete search history.

(56) References Cited

U.S. PATENT DOCUMENTS

| | | | |
|---|---|---|---|
| 7,231,497 B2 * | 6/2007 | Trika | G06F 12/0866 711/129 |
| 7,536,506 B2 | 5/2009 | Ashmore et al. | |
| 2012/0151253 A1 | 6/2012 | Horn | |
| 2012/0166731 A1 | 6/2012 | Maciocco et al. | |
| 2014/0095771 A1 | 4/2014 | Lee et al. | |
| 2014/0181413 A1 | 6/2014 | Manne et al. | |
| 2015/0186281 A1 | 7/2015 | Cherian et al. | |

* cited by examiner

*Primary Examiner* — Brian Peugh
(74) *Attorney, Agent, or Firm* — Fogarty LLP (57) ABSTRACT

Systems and methods for enabling programmable cache size via Class of Service (COS) cache allocation are described. In some embodiments, a method may include: identifying a resource available to an Information Handling System (IHS) having a cache, where the resource is insufficient to allow the entire cache to be flushed during a power outage event; dividing a cache into at least a first portion and a second portion using a COS cache allocation, where the second portion has a size that is entirely flushable with the resource; and flushing the second portion of the cache during the power outage event.

20 Claims, 4 Drawing Sheets

|  | M7 | M6 | M5 | M4 | M3 | M2 | M1 | M0 |
|---|---|---|---|---|---|---|---|---|
| COS0 = eADR | A | A |  |  |  |  |  |  |
| COS1 |  |  | A | A | A | A | A | A |
| COS2 |  |  | A | A | A | A | A | A |
| COS3 |  |  | A | A | A | A | A | A |
| COS4 |  |  | A | A | A | A | A | A |
| COS5 |  |  | A | A | A | A | A | A |
| COS6 |  |  | A | A | A | A | A | A |
| COS7 |  |  | A | A | A | A | A | A |

|  | M7 | M6 | M5 | M4 | M3 | M2 | M1 | M0 |
|---|---|---|---|---|---|---|---|---|
| COS0 = eADR | A | A | A | A |  |  |  |  |
| COS1 |  |  |  |  | A | A | A | A |
| COS2 |  |  |  |  | A | A | A | A |
| COS3 |  |  |  |  | A | A | A | A |
| COS4 |  |  |  |  | A | A | A | A |
| COS5 |  |  |  |  | A | A | A | A |
| COS6 |  |  |  |  | A | A | A | A |
| COS7 |  |  |  |  | A | A | A | A |

|  | M7 | M6 | M5 | M4 | M3 | M2 | M1 | M0 |
|---|---|---|---|---|---|---|---|---|
| COS0 = eADR | A | A | | | | | | |
| COS1 | | | A | A | | | | |
| COS2 | | | | | A | | | |
| COS3 | | | | | | A | | |
| COS4 | | | | | | | A | A |
| COS5 | | | | | | | A | A |
| COS6 | | | | | | | A | A |
| COS7 | | | | | | | A | A |

|  | M7 | M6 | M5 | M4 | M3 | M2 | M1 | M0 |
|---|---|---|---|---|---|---|---|---|
| COS0 (PERSISTENT) | | | A | A | A | A | A | A |
| COS1 (NON-PERSISTENT) | A | A | A | A | A | A | A | A |
| COS2 (NON-PERSISTENT) | A | A | A | A | A | A | A | A |
| COS3 (NON-PERSISTENT) | A | A | A | A | A | A | A | A |
| COS4 (NON-PERSISTENT) | A | A | A | A | A | A | A | A |
| COS5 (NON-PERSISTENT) | A | A | A | A | A | A | A | A |
| COS6 (PERSISTENT) | | | A | A | A | A | A | A |
| COS7 (NON-PERSISTENT) | A | A | A | A | A | A | A | A |
| AVAILABLE FOR COS WITH PERSISTENT MEMORY | | | A | A | A | A | A | A |

PROGRAMMABLE CACHE SIZE VIA CLASS OF SERVICE CACHE ALLOCATION

FIELD

This disclosure relates generally to Information Handling Systems (IHSs), and more specifically, to systems and methods for enabling programmable cache size via class of service cache allocation.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may have one or more processors, and each processor may include a cache. A cache is a volatile memory that needs energy in order to maintain stored data. During operation of a processor, data read from main memory may be cached to reduce the access time of frequently read data, and write data destined to main memory may be cached to reduce the latency of write operations and to eliminate main memory operations for data that may be modified frequently. Until the write data contents of a cache are moved to main memory, that data is said to be "dirty," because the cache contains a more up-to-date copy of the data than the main memory contents for a specific system memory address. Ordinarily, in case of a power outage affecting the IHS, all "dirty" cache data is lost in addition to the contents of all volatile main memory.

SUMMARY

Embodiments of systems and methods for enabling programmable cache size via Class of Service (COS) cache allocation are described herein. In an illustrative, non-limiting embodiment, a method may include: identifying a resource available to an Information Handling System (IHS) having a cache, where the resource is insufficient to allow the entire cache to be flushed during a power outage event; dividing a cache into at least a first portion and a second portion using a COS cache allocation, where the second portion has a size that is entirely flushable with the resource; and flushing the second portion of the cache during the power outage event.

In some embodiments, the resource may include: (a) an amount of energy available to the IHS during the power outage event, or (b) an amount of time available to the IHS during the power outage event. The method may also include flushing the second portion of the cache to a Storage Class Memory (SCM) device.

The method may include allocating the first portion to a COS dedicated to a process that does not perform any cache writes. For example, the process may be an Asynchronous Data Refresh. The method may further include reducing a total number of COSs presented to an Operating System (OS) by a number of COSs reserved for cache allocation.

In some cases, dividing the cache may include applying a bitmask to the cache wherein each set bit in the bitmask indicates that a given cache allocation is reserved and cannot be used by any OS. The method may include, prior to the power outage, applying the bitmask to a bit set by the OS that conflicts with the given cache allocation. In other cases, flushing the second portion of the cache may include issuing a command to flush a COS associated with the second portion of the cache.

In another illustrative, non-limiting embodiment, an IHS may include: a processor; a cache coupled to the processor; and a memory coupled to the processor, the memory having program instructions stored thereon that, upon execution by the processor, cause the IHS to: divide the cache into at least a first portion and a second portion using a COS cache allocation, where the cache has a size that is not entirely flushable through consumption of a resource available to the IHS during a power failure, and where the second portion has a size that is flushable through consumption of the available resource during the power failure.

In some cases, the available resource may include: (a) an amount of energy available to the IHS during the power failure, or (b) an amount of time available to the IHS during the power failure.

The program instructions, upon execution, may cause the IHS to allocate the first portion to a COS dedicated to a process that does not perform any cache writes. The program instructions, upon execution, may further cause the IHS to reduce a total number of COSs presented to an OS by a number of COSs reserved for cache allocation.

The program instructions, upon execution, may further cause the IHS to, prior to the power failure, apply a bitmask to a bit set by the OS that conflicts with the COS cache allocation. Additionally or alternatively, the program instructions, upon execution, may further cause the IHS to flush the second portion by issuing a command to flush a COS associated with the second portion.

In yet another illustrative, non-limiting embodiment, a memory device may have program instructions stored thereon that, upon execution by a processor of an IHS, cause the IHS to: divide a cache into at least a first portion and a second portion, where the first portion is associated with a first a COS and the second portion is associated with a second COS; and flush the second portion and not the first portion during in response to a power failure.

In some implementations, the cache may have a total size that is not entirely flushable in response to the power failure, and the second portion may have a size that is flushable in response to the power failure. Moreover, the first COS may be dedicated to a process that does not perform any cache writes.

The program instructions, upon execution, may further cause the IHS to, prior to the power failure, apply a bitmask to a bit set by an OS that conflicts with a COS cache allocation. Additionally or alternatively, the program instructions, upon execution, may further cause the IHS to issue a command to flush cache data associated with the second COS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
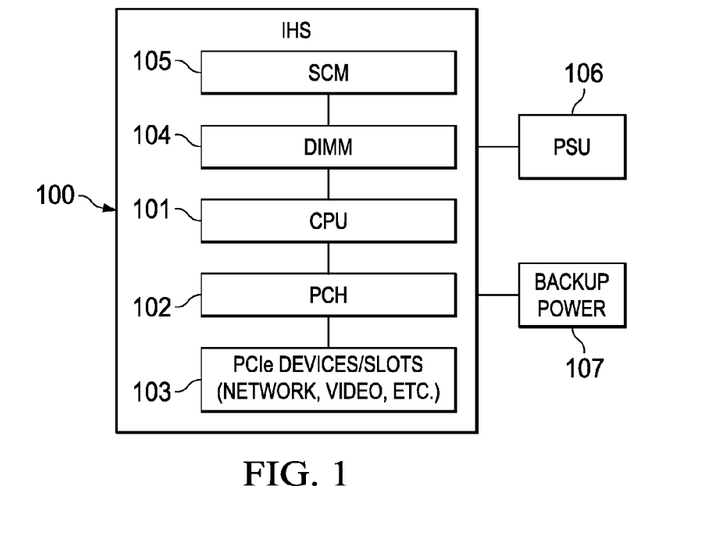
FIG. 1 is a block diagram of an example of an Information Handling System (IHS) according to some embodiments.

FIG. 1 shows a block diagram of an example of IHS 100. In this illustrative, non-limiting embodiment, IHS 100 includes one or more Central Processing Unit(s) (CPU) 101 described in more detail with respect to FIG. 2. IHS 100 also includes one or more Platform Controller Hub(s) (PCH) 102 and one or more Peripheral Component Interconnect Express (PCIe) device(s) or slot(s) 103 (e.g., network devices, video devices, storage devices, etc.) that are coupled to CPU 101 either directly or via PCH 102. Each CPU 101 is further coupled to one or more Dual In-Line Memory Module(s) (DIMM) 104, which in some cases are coupled to one or more Storage Class Memory (SCM) device(s) 105.

CPU 101 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, CPU 101 may interpret and/or execute program instructions and/or process data stored in SCM device 105, and may output results, a graphical user interface (GUIs), or the like, for example, via a display or over a network using one or more of PCIe devices 103.

In various embodiments, SCM device 105 may include memory devices that combine certain benefits of solid-state memories, such as high performance and robustness, with the retention capabilities and low cost of conventional hard-disk magnetic storage. In some cases, SCM device 105 may include solid-state, non-volatile memory technology manufactured at a high effective area density using a combination of sub-lithographic patterning techniques, multiple bits per cell, and/or multiple layers of devices.

Still referring to FIG. 1, SCM device 105 may be coupled to CPU 101 via a memory channel such as DDR4, which may also be used to couple DIMM 104 to CPU 101. DIMMs 104 and SCM 105 are accessed within the physical main memory space of CPU 101, and thus may be advantageously cached by CPU 101. In some cases, each SCM DIMM 104/105 may be configured to appear as a Block Storage Device or as application byte addressable persistent memory. Different implementations may employ various techniques to provide redundancy, including striping, mirroring, and/or parity checking.

One or more Power Supply Unit(s) (PSU) 106 may include a system, device, and/or apparatus operable to supply DC electrical power directly to one or more components of IHS 100, including, for example, CPU 101 and/or SCM 105. In some embodiments, PSU 106 may include one or more uninterruptible power supply units or switch mode power supply units. Alternatively, PSU 106 may include an array of programmable DC power sources.

Backup power source 107 may include any system, device, and/or apparatus operable to temporarily supply DC electrical power directly to CPU 101 and/or SCM 105, for example, when AC power to PSU 106 is interrupted or PSU 106 fails, thereby preserving the integrity of the data stored in various components of IHS 100 up until backup power source 107 discharges (or also fails). In some cases, backup power source 107 may be part of PSU 106, or it may be a distinct and separate component therefrom.

For example, backup power source 107 may include a capacitor, super capacitor, battery, or other suitable power supply or supplies. In various embodiments, the use of backup power source 107 may temporarily preserve data stored in storage mediums, such as volatile memories, which generally lose data when a power outage or failure event occurs.

As the inventors hereof have recognized, the emerging use of SCMs 105 can impose severe burdens upon backup power source 107, such that, upon failure of PSU 106, backup power source 107 can only maintain IHS 100 fully operational for ~10 to 100 milliseconds-generally referred to herein as the "hold-up time," which may not be enough to flush all dirty cached data to SCM.

Figure 2:
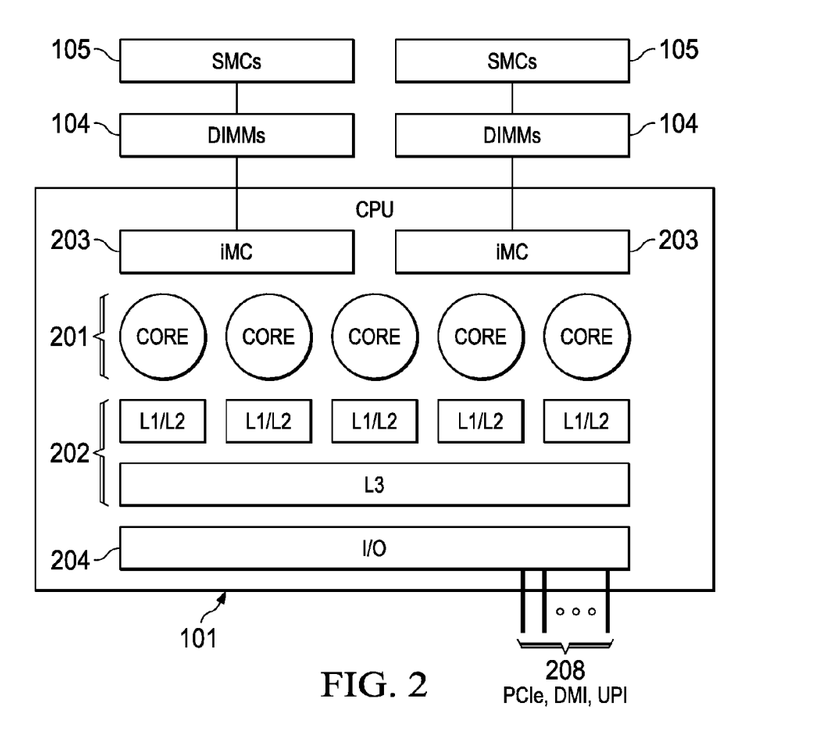
FIG. 2 is a block diagram of an example of a Central Processing Unit (CPU) according to some embodiments.

FIG. 2 is a block diagram of an example of CPU 101. In this illustrative, non-limiting example, CPU 101 includes a plurality of cores 201, each having access to Level 1 (L1), Level 2 (L2), and/or Level (L3) cache 202. CPU 200 also includes I/O controller 204 communicatively coupled to a plurality of PCIe, Direct Media Interface (DMI), and/or UltraPath Interconnect (UPI) devices 208. CPU 101 further includes a plurality of Integrated Memory Controllers (iMCs) 203, each having a plurality of channels coupled to DIMMs 104 and/or SCMs 105.

Generally, cache 202 may comprise one or more volatile memory devices operable to retain program instructions or data while power is being provided to IHS 100. Once power ceases to be provided to IHS 100 (e.g., PSU 106 fails and backup power source 107 also runs out of power), the contents of cache 202 are lost and non-recoverable—unless those contents have been flushed to a non-volatile memory such as, for example, SCM device 105.

iMCs 203 may be communicatively coupled to cores 201 and to SCMs 105, and may include any hardware, software, and/or firmware configured to control the data transfer between cores 201 and SCMs 105. Additionally or alternatively, iMCs 203 may be configured to control data transfer between SCMs 105.

In operation, cores 201 may be configured to send and receive signals to and from cache 202. In the event of a power interruption (e.g., power failure), cores 201 may provide signals to flush any data stored in cache 202 at or during the time of the power failure/event. The communicative interactions between cores 201 and cache 202 are described in more detail below.

Generally, cache 202 is configured to store a collection of data that is quickly accessible to cores 201. In some embodiments, data stored in cache 202 may be transferred to a non-volatile storage device (e.g., SCM 105) upon detection of a power failure of IHS 100. That is, data temporarily stored in volatile cache memory may subsequently be transferred to a storage device (e.g., flushed to a permanent or non-volatile storage medium) external to CPU 101.

Depending on the various states of the cache 202 and/or a power event, cores 201 may send control signals and/or request signals from cache 202. For example, cores 201 may send a signal indicating which write mode (e.g., write through or write back) it is using. Based at least on the sent and received signals, cache 202 may initiate data transfers from cache 202 to the non-volatile storage device.

CPU caches configured for write-back operation provide certain performance advantages over write-through caches for many applications. With the introduction of Persistent Memory off the CPU's DDR4 memory interface, for example, write-back cache is highly desirable for performance. However, embodiments described herein also support write back cache supplemented with a sequence of CPU instructions (CFLUSHOPT, SFENCE, PCOMMIT, SFENCE) to ensure persistence of data to SCM 105. Software may then use this point of order to recover from any data loss.

There is a time gap between when the data was modified and when this sequence completes, thus the potential for some data loss. This overheard to regularly flush cache lines significantly impacts performance compared to a true write-back cache behavior.

Hold-up is often defined in terms energy (power×time). The time to flush the CPU's cache and the power consumption of the system during the cache flush impact the required energy. While methods exist to reduce power consumption, the biggest component is the time to complete the cache flush, which may be on the order of 3-50 milliseconds depending on the memory configuration, performance of the memory target, etc.

In various embodiments, systems and methods described herein may limit the amount modified data in the write back cache—that is, it may artificially and/or purposefully decrease the worst-case size of the cache that may need to be flushed—to therefore also reduce the time and/or energy necessary to complete a cache flush operation.

Figure 3:
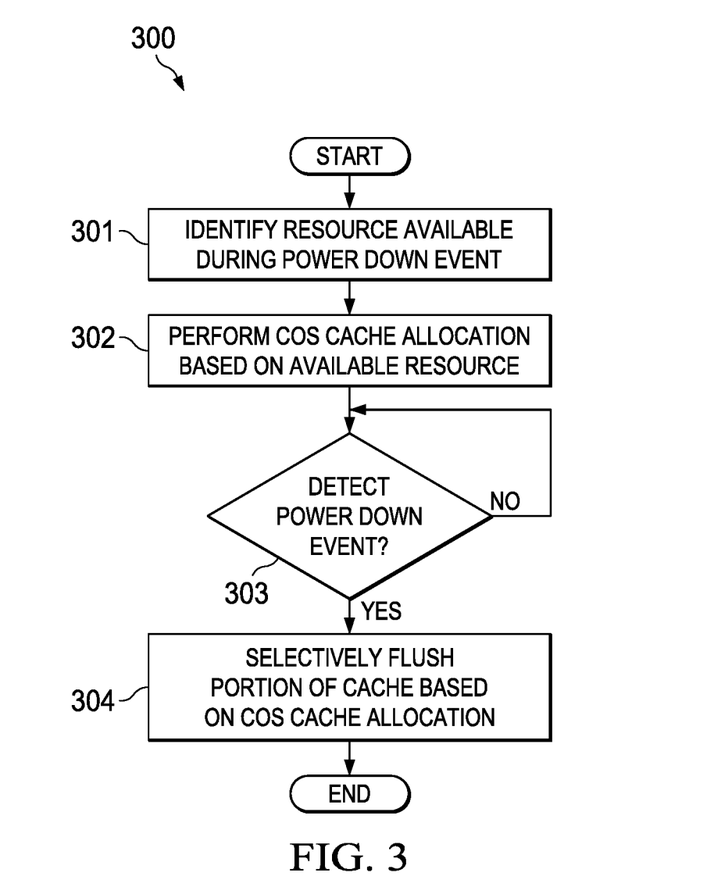
FIG. 3 is a flowchart of an example of a method for enabling programmable cache size via class of service cache allocation according to some embodiments.

FIG. 3 is a flowchart of an example of a method for enabling programmable cache size via class of service cache allocation according to some embodiments. At block 301, method 300 includes identifying an alternative energy resource available during a power outage event. For example, the resource may be identified in terms of energy available (e.g., stored in a capacitor, battery, etc.) during the event.

For example, resource A may be the available intrinsic energy available in a first PSU 106, resource B may be the intrinsic energy available in another PSU (not shown), and resource C may be the energy available in a dedicated hold-up purpose battery included within backup power source 107. The total energy available to hold the system up through an unexpected power loss is thus the sum of energies in resources A-C.

In some embodiments, power supplies, batteries, etc. may support digital interfaces, such as $I^2C$ or PMBus, that enable IHS 100 to read various parameters about the component. This digital interface can be used to read the hold up capabilities, battery charge, etc. Additionally or alternatively, the resource may be identified in term of the amount of time available between the event and the actual shut down of IHS 101.

At block 302, method 300 performs a COS cache allocation based upon the available resource. For example, in some embodiments, method 300 may determine that only a certain percentage of the total cache can be flushed with the available hold up power resource, and may perform a COS allocation such that only that same percentage of the cache needs to be flushed in response to the power event; whereas the remainder of the cache does not.

Figure 4:
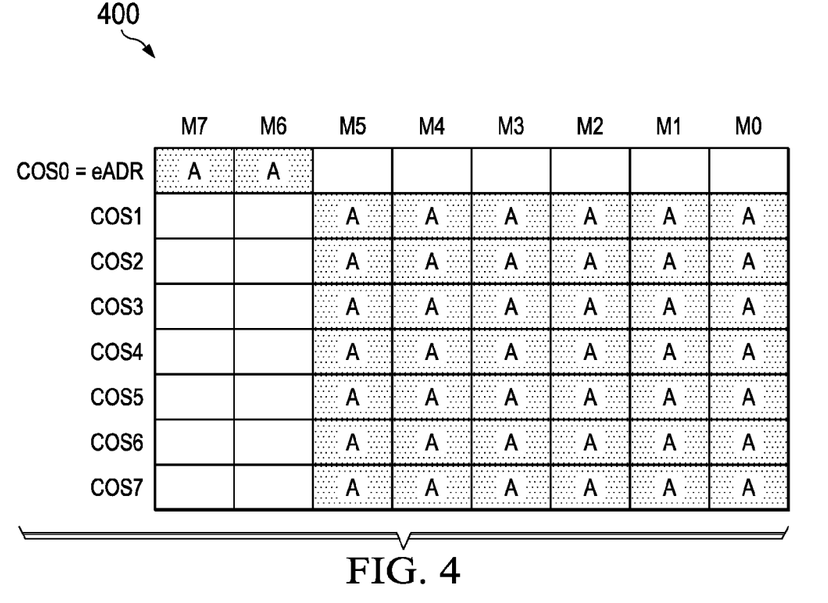
FIGS. 4-7 are diagrams of examples of different bitmasks that may be used in various embodiments.
Figure 5:
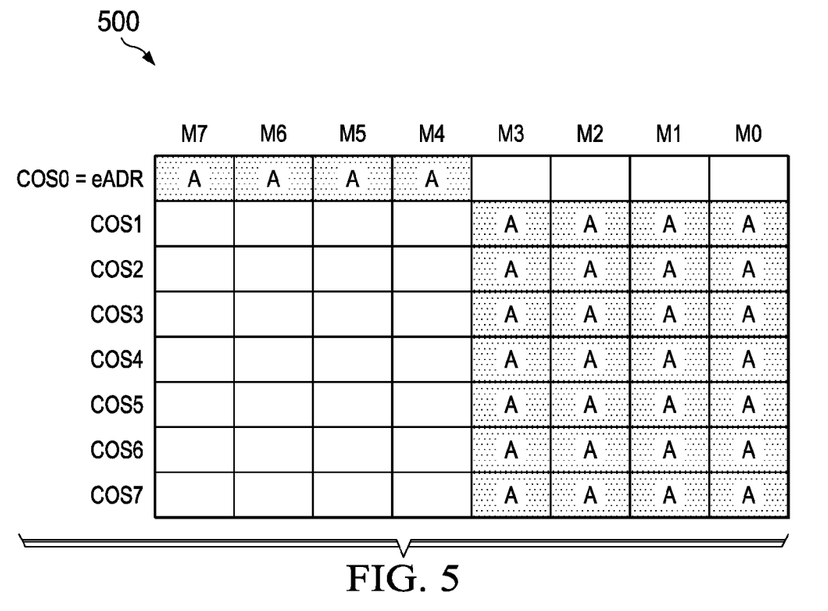
Figure 6:
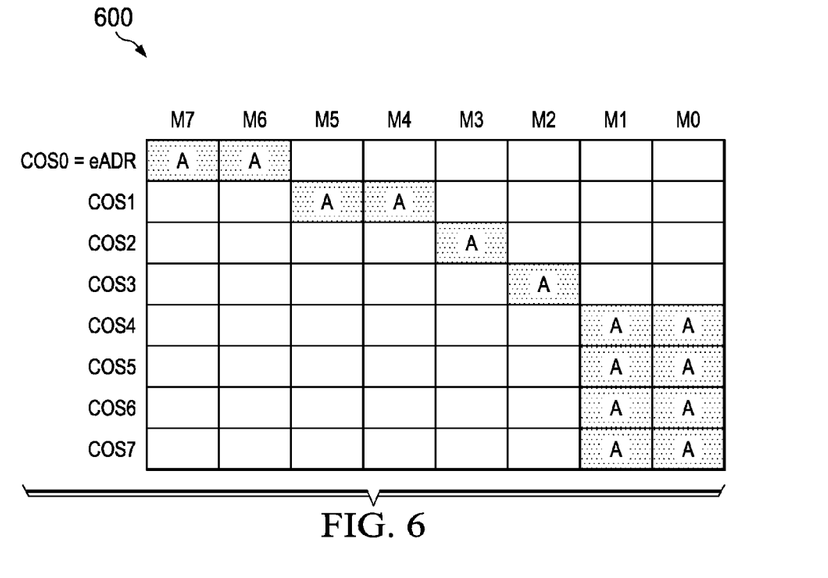

Particularly, for the embodiments detailed in FIGS. 4-6, a COS cache allocation reserves the amount of cache that cannot be supported hence it is equal to 100%−CACHE_PERCENTAGE_SUPPORTED.

Figure 7:
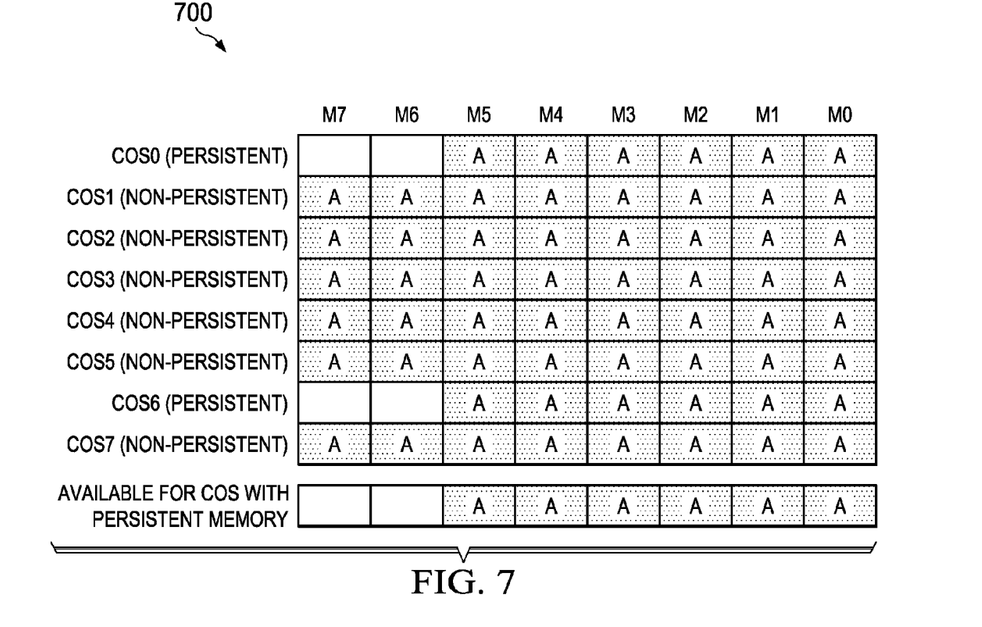

In other embodiments, however, as shown in FIG. 7, the COS allocation is actually used by applications that need persistent memory, and the COS allocation is limited by the mask that indicates how much can be allocated for persistent memory. In such cases, this is the CACHE_PERCENTAGE_ SUPPORTED.

In some implementations, block 302 may be a one-time operation during Power-on Self-Test (POST). The COS allocation need not occur at runtime; but thereafter applications only use the cache allocation that they had been limited to during runtime. After power loss, a limited portion of the cache may be flushed as further described herein. In other embodiments, COS allocation may be re-run throughout runtime periodically, after detection of a triggering event, or at other times, to re-adjust the cache size limit upon changes to the available holdup energy resources. For instance, over time backup power 107 capacity may degrade, necessitating a lower COS allocation limit, or a new PSU 106 may be hot-plugged into IHS 100 allowing a high COS allocation limit.

At block 303, method 300 may detect a power failure which then triggers a flushing operation. Then, at block 304, method 300 may selectively flush a portion of the total cache based upon the COS cache allocation. Alternatively, other embodiments simply block portions of the cache from being used by applications, thus the blocked portion never has modified data that needs be flushed—the actual result is that a smaller allocation of the cache gets flushed. Implementation of blocks 302 and/or 304 of method 300 may utilize different embodiments discussed in turn below.

In a first embodiment, cache size is reduced at block 302 by utilizing Cache Allocation Technology (CAT) or another similar technology to allocate portions of the cache to a Class of Service (COS) dedicated to a process that does not perform any cache writes during the IHS's normal operation. An example of such a process includes the platform Enhanced Asynchronous Data Refresh (eADR) process. No thread actually utilizes the COS dedicated to platform eADR, thus no cache lines are ever modified. When the eADR process executes the Whole Cache Flush and Invalidate (WBINVD) instruction, the cache allocated to platform eADR does not generate any writes, thus reducing the number of writes required to complete eADR, and therefore reducing the time to complete eADR.

In a second embodiment, a new command is introduced at block 304, referred to herein as COSFLUSH, that flushes a specified Class of Service. (Conventional CPU instruction sets presently support only two primary command for flushing the cache: WBINVD and Cache Line Flush or "CLFLUSH.") This embodiment also leverages Cache Allocation Technology at block 302, but further adds the capability for the platform to specify cache allocation limits for Persistent Memory. The OS/Hypervisor is responsible for limiting the cache allocation for applications that utilize Persistent Memory. When eADR is triggered, the IHS executes COSFLUSH only for COS marked as using Persistent Memory. This solution enables the entire cache to be utilized by applications that do not utilize Persistent Memory, but limits the cache allocation for applications that do utilize Persistent Memory to manage the time required to complete the eADR process.

Class of Service Cache Allocation for Platform

As noted above, systems and methods described herein may reduce cache size by utilizing Intel Cache Allocation Technology (CAT) or other similar technologies. Certain processor manufacturers (e.g., INTEL) offer capabilities to configure and make use of the Cache Allocation Technology (CAT). Broadly speaking, CAT enables an OS, Hypervisor/ Virtual Machine Manager (VMM) or similar system service management agent to specify the amount of cache space into which an application can fill. User-level implementations with minimal OS support are also possible, and the technology is designed to scale across multiple cache levels and technology generations.

CAT mechanisms may provide one or more of the following features: (A) a mechanism to enumerate platform Cache Allocation Technology capabilities and available resource types that provides CAT control capabilities (for implementations that support Cache Allocation Technology, CPUID provides enumeration support to query more specific CAT capabilities, such as the max allocation bitmask size); (B) a mechanism for the OS or Hypervisor to configure the amount of a resource available to a particular Class of Service via a list of allocation bitmasks; (C) a mechanism for the OS or Hypervisor to signal the Class of Service to which an application belongs; and (D) hardware mechanisms to guide the LLC fill policy when an application has been designated to belong to a specific Class of Service.

As such, CAT technology is used to allocate CPU cache resources to Classes of Service (COS). CAT is an architecturally exposed technology; meaning it is accessible by the OS/Hypervisor for assigning applications to different COS and allocating cache resources.

This first embodiment assigns one of the COS for platform eADR use instead of for application use. For the platform COS, no platform application (i.e., System Management Mode) actually utilizes the assigned COS, thus no cache lines are modified. After a power fault or powering down event triggers the eADR process, the Basic Input/ Output System (BIOS) executes the WBINVD instruction to flush modified cache lines in the CPUs' cache back to persistent memory. The cache allocated to platform eADR COS will not generate any writes, thus reducing the number of writes required to complete eADR, and therefore reducing the time to complete the WBINVD portion of eADR.

To enable these features, the following extensions may be added. First, a CPU configuration register may enable the platform's BIOS to reserve a COS for the IHS, which is then used for cache allocation purposes. In some embodiments, a CPUID instruction may be be modified to reduce the maximum number of Classes of Service presented to OS/Hypervisor based on quantity of COS reserved to platform.

Second, cache allocation may be reserved for platform COS. In some embodiments, the CPUID instruction may be further modified to add a bitmask where each set bit within it indicates that the cache allocation is reserved for the platform, and shall not be used by the OS/Hypervisor. That is, each set bit indicates that the corresponding unit of the cache allocation may be used by other entities in the platform (e.g., an integrated graphics engine or hardware units outside the processor core and have direct access to cache).

Third, the hardware may enforce the platform cache allocation. A cache controller within CPU 101 masks any bits (set in IA32_resourceType_MASK_n of Model-Specific Registers or "MSRs") by the OS/Hypervisor that conflict with cache allocation reserved for the platform. Error status may also be generated to notify OS/Hypervisor.

These extensions, taken alone or in combination, ensure that the OS/Hypervisor does not use the platform's cache allocation. To illustrate the foregoing, consider the following examples illustrated in FIGS. 4-6, to which the following assumptions apply. First, the CPUID leaf function 10H (CAT enumeration leaf) supports CAT, the resource type is L3, the capacity bit mask length is 8 bits, and the maximum number of classes of service is 8. Also, the platform has reserved COS0 for eADR. As COS0 is not actually used, the associated cache allocation is reserved and never used. No modified data is ever be present in the cache memory allocated for COS0, and therefore this section of cache memory will not generate writes in response to WBINVD— that is, there is no COS0 data that needs to be flushed thus reducing the effective size of the cache.

In FIG. 4, bitmask 400 shows that columns M6 and M7 are allocated to COS0 (that is, to eADR), whereas columns M0-M5 are available for all other classes of service COS1-7 (that is, for the Operating System and its applications or processes). Accordingly, this example results in a 25% reduction in flushable cache size by reserving COS0 for eADR with a default bitmask for other COSs.

In FIG. 5, bitmask 500 shows that columns M4-M7 are allocated to COS0 (also eADR), while columns M0-M3 are available for the other classes of service COS1-7. Accordingly, in this example, there is a 50% flushable cache reduction—half of the cache is allocated to eADR, which is not used because the process or thread does not generate cache writes, and therefore does is not flushed in response to the power event.

In FIG. 6, bitmask 600 shows that columns M6 and M7 are allocated to COS0 (still eADR), columns M4 and M5 are served for COS1, column M3 is reserved for COS2, column M3 is reserved for COS3, and columns M0 and M1 are available to other classes of service. Similarly as in FIG. 4, here there is a 25% cache reduction for eADR with OS/VMM enabled for other COSs.

Class of Service Flush Command

In addition to the implementations and modifications of the CAT described above, in some cases the system and methods described herein may introduce a COS flush command. Particularly, a new register may be added for the OS/Hypervisor to specify whether or not a thread utilizes Persistent Memory—that is, in addition to specifying Class of Service (IA32_PQR_ASSOC) and cache allocation (IA32_resourceType_MASK_n MSR) for the thread.

Also, instead of reserving cache allocation for the platform, a CPUID instruction may be modified to add a bitmask where each set bit within indicates which section of the cache may be allocated by the OS/Hypervisor to COS which utilizes Persistent Memory. The entire cache may still be available to COS that do not utilize Persistent Memory.

Moreover, a new CPU instruction is created (or existing instruction modified)—i.e., COSFLUSH—such that the eADR process can flush only the cache sections allocated to COS that utilize Persistent Memory.

In the example shown in FIG. 7, bitmask 700 limits COSs that utilize Persistent Memory to columns M0-M5, whereas COSs that do not utilize Persistent Memory can allocate up to columns M0-M7. Accordingly, when COSFLUSH is executed with COS0 specified, only modified cache lines in M0-M5 would be flushed. Unlike in the previous embodiment, here the full cache is still available to applications, but the cache allocation for applications that utilize Persistent Memory has been reduced to reduce cache flush times such that Persistent Memory solutions can be supported with a write-back cache.

In summary, the various embodiments described herein deliver Storage Class Memory to enable higher performance solutions by providing a novel solution to enable performance enhancing CPU write-back cache despite having limited hold-up energy or time available.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
identifying a resource available to an Information Handling System (IHS) having a cache, wherein the resource is insufficient to allow the entire cache to be flushed during a power outage event;
dividing a cache into at least a first portion and a second portion using a Class of Service (COS) cache allocation, wherein the second portion has a size that is entirely flushable with the resource; and
flushing the second portion of the cache during the power outage event.

2. The method of claim 1, wherein the resource includes: (a) an amount of energy available to the IHS during the power outage event, or (b) an amount of time available to the IHS during the power outage event.

3. The method of claim 1, further comprising flushing the second portion of the cache to a Storage Class Memory (SCM) device.

4. The method of claim 1, further comprising allocating the first portion to a COS dedicated to a process that does not perform any cache writes.

5. The method of claim 4, wherein the process is an Asynchronous Data Refresh.

6. The method of claim 1, further comprising reducing a total number of COSs presented to an Operating System (OS) by a number of COSs reserved for cache allocation.

7. The method of claim 1, wherein dividing the cache further comprises applying a bitmask to the cache wherein each set bit in the bitmask indicates that a given cache allocation is reserved and cannot be used by any Operating System (OS).

8. The method of claim 7, further comprising, prior to the power outage event, applying the bitmask to a bit set by the OS that conflicts with the given cache allocation.

9. The method of claim 1, wherein flushing the second portion of the cache includes issuing a command to flush a COS associated with the second portion of the cache.

10. An Information Handling System (IHS), comprising:
a processor;
a cache coupled to the processor; and
a memory coupled to the processor, the memory having program instructions stored thereon that, upon execution by the processor, cause the IHS to:
divide the cache into at least a first portion and a second portion using a Class of Service (COS) cache allocation, wherein the cache has a size that is not entirely flushable through consumption of a resource available to the IHS during a power failure, and wherein the second portion has a size that is flushable through consumption of the available resource during the power failure.

11. The IHS of claim 10, wherein the available resource includes: (a) an amount of energy available to the IHS during the power failure, or (b) an amount of time available to the IHS during the power failure.

12. The IHS of claim 10, wherein the program instructions, upon execution, further cause the IHS to allocate the first portion to a COS dedicated to a process that does not perform any cache writes.

13. The IHS of claim 10, wherein the program instructions, upon execution, further cause the IHS to reduce a total number of COSs presented to an Operating System (OS) by a number of COSs reserved for cache allocation.

14. The IHS of claim 13, wherein the program instructions, upon execution, further cause the IHS to, prior to the power failure, apply a bitmask to a bit set by the OS that conflicts with the COS cache allocation.

15. The IHS of claim 10, wherein the program instructions, upon execution, further cause the IHS to flush the second portion by issuing a command to flush a COS associated with the second portion.

16. A memory device having program instructions stored thereon that, upon execution by a processor of an Information Handling System (IHS), cause the IHS to:
- divide a cache into at least a first portion and a second portion, wherein the first portion is associated with a first a Class of Service (COS) and the second portion is associated with a second COS; and
- flush the second portion and not the first portion during in response to a power failure.

17. The memory device of claim 16, wherein the cache has a total size that is not entirely flushable in response to the power failure, and wherein the second portion has a size that is flushable in response to the power failure.

18. The memory device of claim 16, wherein the first COS is dedicated to a process that does not perform any cache writes.

19. The memory device of claim 16, wherein the program instructions, upon execution, further cause the IHS to, prior to the power failure, apply a bitmask to a bit set by an Operating System (OS) that conflicts with a COS cache allocation.

20. The memory device of claim 16, wherein the program instructions, upon execution, further cause the IHS to issue a command to flush cache data associated with the second COS.

\* \* \* \* \*